United States Patent
Takeyama et al.

(10) Patent No.: US 10,511,045 B2
(45) Date of Patent: Dec. 17, 2019

(54) FUEL CELL AND FUEL CELL SYSTEM

(71) Applicant: TOYOTA JIDOSHA KABUSHIKI KAISHA, Toyota-shi, Aichi-ken (JP)

(72) Inventors: Makoto Takeyama, Toyota (JP); Tateki Takayama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 738 days.

(21) Appl. No.: 14/926,520

(22) Filed: Oct. 29, 2015

(65) Prior Publication Data

US 2016/0133984 A1    May 12, 2016

(30) Foreign Application Priority Data

Nov. 12, 2014  (JP) ................................ 2014-229648

(51) Int. Cl.
*H01M 8/24*     (2016.01)
*H01M 8/2475*   (2016.01)
*H01M 8/1018*   (2016.01)

(52) U.S. Cl.
CPC .. *H01M 8/2475* (2013.01); *H01M 2008/1095* (2013.01)

(58) Field of Classification Search
CPC ....... H01M 8/2475; H01M 2008/1095; H01M 8/248; H01M 8/247
See application file for complete search history.

(56) References Cited

U.S. PATENT DOCUMENTS

| | | | |
|---|---|---|---|
| 6,720,101 B1* | 4/2004 | Dong | H01M 8/2475 429/435 |
| 2006/0251946 A1 | 11/2006 | Makuta et al. | |
| 2007/0269702 A1* | 11/2007 | Nakajima | H01M 8/0276 429/442 |
| 2009/0087720 A1* | 4/2009 | Okabe | H01M 8/248 429/454 |
| 2010/0119902 A1* | 5/2010 | Uematsu | H01M 8/0273 429/465 |
| 2012/0045702 A1* | 2/2012 | Takahashi | H01M 8/1213 429/423 |
| 2015/0056537 A1* | 2/2015 | Yagi | H01M 8/0247 429/495 |

(Continued)

FOREIGN PATENT DOCUMENTS

DE   11 2008 000 472 B4   5/2014
DE   10 2014 220 529 A1   7/2015
(Continued)

*Primary Examiner* — Michael L Dignan
(74) *Attorney, Agent, or Firm* — Finnegan, Henderson, Farabow, Garrett & Dunner, LLP

(57) ABSTRACT

A fuel cell includes a stacked body formed by stacking a plurality of unit cells, an end plate arranged on at least one end of the stacked body in a stacking direction, a fuel cell case including an opening portion and incorporating the stacked body, wherein the opening portion has a substantially polygonal outer circumference shape with a plurality of corners, and a plurality of types of fasteners with different load resistances that fix the end plate, closing the opening portion of the fuel cell case, to the fuel cell case. A fastener, of the plurality of types of fasteners, of a type with a highest load resistance is arranged at at least one of the plurality of corners of the opening portion.

8 Claims, 4 Drawing Sheets

(56) References Cited

U.S. PATENT DOCUMENTS

2015/0188179 A1* 7/2015 Suh ................. H01M 8/248
                                                    264/263

FOREIGN PATENT DOCUMENTS

| | | |
|---|---|---|
| JP | 2005-155485 A | 6/2005 |
| JP | 2006-331805 | 12/2006 |
| JP | 4222194 B2 | 2/2009 |
| JP | 2010-267465 | 11/2010 |
| JP | 2011-175808 A | 9/2011 |
| JP | 2013-4352 | 1/2013 |
| JP | 5574746 B2 | 8/2014 |

* cited by examiner

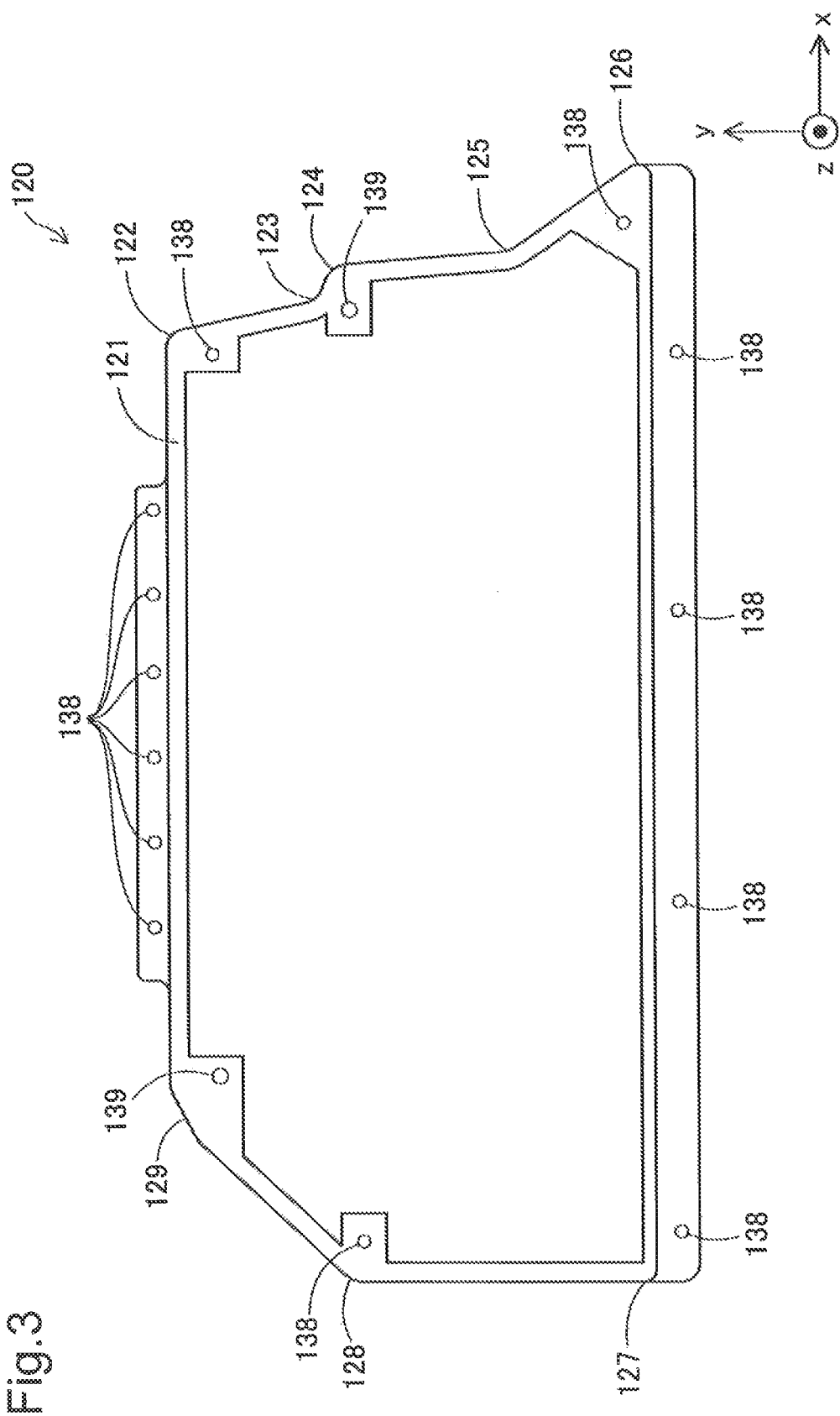

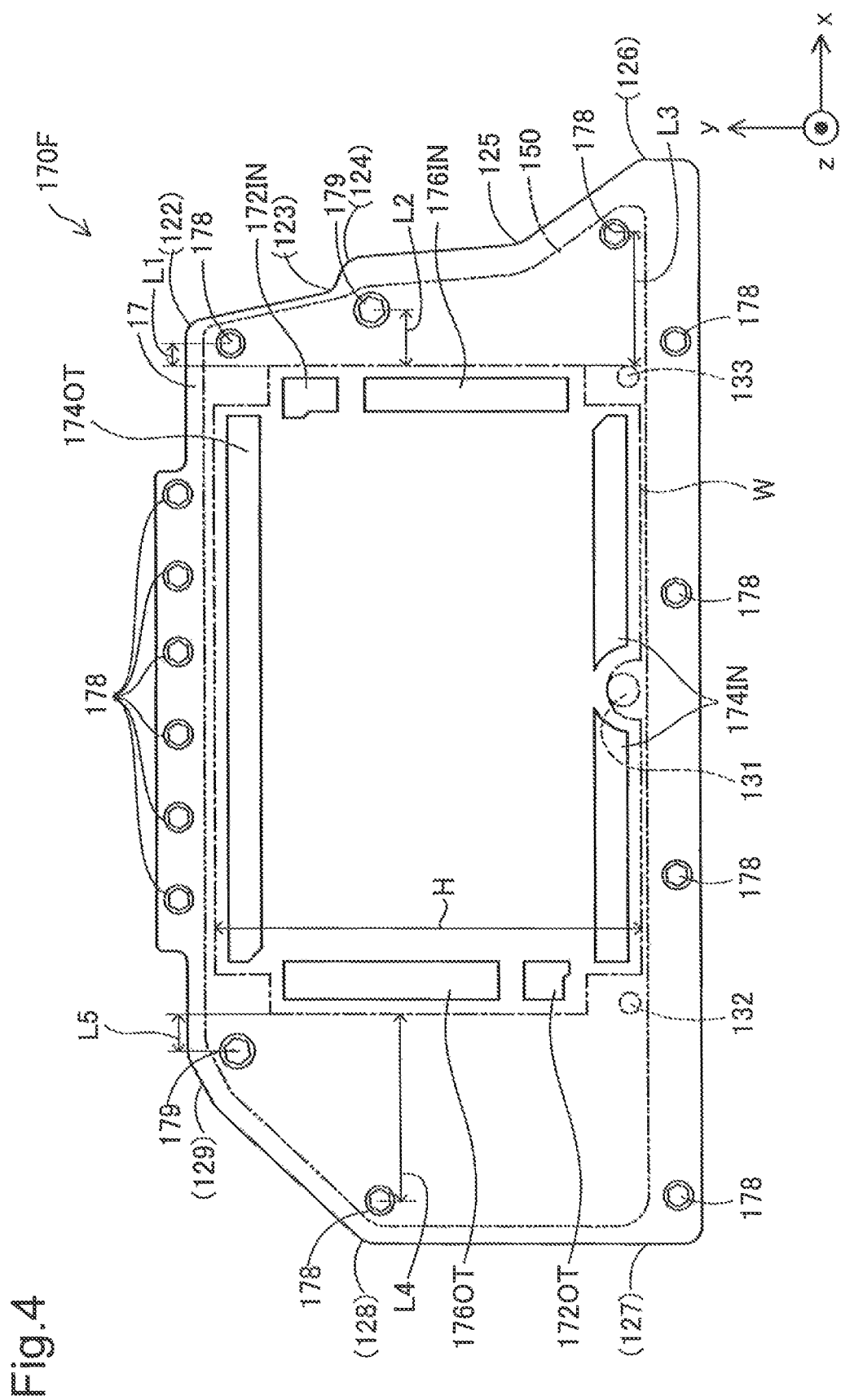

FUEL CELL AND FUEL CELL SYSTEM

CROSS-REFERENCE TO RELATED APPLICATION

The present application claims priority to Japanese Patent Application No. 2014-229648, filed on Nov. 12, 2014, the contents of which are incorporated herein by reference.

BACKGROUND

Field

The present invention relates to a fuel cell and to a fuel cell system.

Related Art

Fuel cells have been known that include end plates on both sides of a stacked body formed by stacking a plurality of unit cells. A configuration of such a fuel cell has been proposed in which the stacked body is accomodated in a fuel cell case avid one of the end plates, closing an opening portion, is fixed to the fuel cell case with a bolt (JP2013-228192A).

In the fuel cell having a stacked structure obtained by stacking the unit cells, a compressive load is applied in a stacking direction to maintain the stacked state and a favorable contact state among the unit cells. In the structure in which the end plate is fixed to the fuel cell case with the bolt as described above, a bolt with a small shaft diameter (nominal diameter) has conventionally been employed to achieve high apace efficiency. The compressive load, applied to the stacked body, is maintained by the bolt hastening the end plate to the fuel cell case. Thus, when the bolt with a small shaft diameter is used, a shaft of the bolt might be extended by reaction against the compressive load (plastic deformation). When the shat of the bolt is extended, a gap might be formed between the end plate and the fuel cell case, and thus the compression state of the stacked body might fail to be favorably maintained. As a result, the compressive load applied to the stacked body might be reduced. Thus, a technique has been called for that prevents the reduction of the compressive load applied to the stacked body, in the fuel cell having the stacked structure obtained by stacking a plurality of unit cells.

SUMMARY

The present invention is made to at least partially solve the problem described above, and can be implemented as the following aspects.

(1) One aspect of the present invention provides a fuel cell. The fuel cell includes a stacked body formed by stacking a plurality of unit cells, an end plate arranged on at least one end of the stacked body in a stacking direction, a fuel cell case including an opening portion, having a substantially polygonal outer circumference shape with a plurality of corners, the fuel cell case incorporating the stacked body, and a plurality of types of fasteners with different load resistances that fix the end plate, closing the opening portion of the fuel cell case, to the fuel cell case. A fastener, of the plurality of types of fasteners, of a type with a highest load resistance is arranged at at least one of the plurality of corners of the opening portion.

In the fuel cell according to this aspect, the fastener of the type with the highest load resistance is arranged at the corner of the opening portion of the fuel cell case. Since the corner of the opening portion of the fuel cell case has nigh rigidity, large force (hereinafter also referred to as axial force) acts on the fastener arranged at the corner in an axis direction of the fastener against compressive load applied to the stacked body. Since the fastener of the type with the highest load resistance is arranged at the corner of the opening portion of the fuel cell case, the deforming (extending) of the fastener in the axis direction is prevented even when large axial force acts on the fastener, compared with a case where a fastener of a type with a low load resistance is arranged thereat. Thus, a gap is prevented from being formed between the end plate and the fuel cell case, and the compressive load applied to the stacked body can be prevented from being reduced. Fasteners of the same material provide a higher load resistance with a larger shaft diameter. For this reason, by arranging a fastener with a high load resistance at a portico where large axial force acts on the fastener, while arranging fasteners with a lower load resistance (than that of the fastener with the high load resistance) at the other portions, the fastening strength between the end plate and the fuel cell case can be ensured and the compressive load applied to the stacked body can be prevented from being reduced, efficiently with a small space used for arranging the fasteners. By using a plurality of types of fasteners with different load resistances that nave the same shaft diameter but contain materials with different strengths, the space used for arranging the fasteners can be further reduced.

(2) In the fuel cell according to the above-described aspect, the corner where the fastener of the type with the highest load resistance is arranged may be close to the stacked body. In the end plate disposed at one end of the stacked body, large reaction against the compressive load applied to the stacked body acts on a portion close to the stacked body. Thus, larger axial force acts on the bolt arranged at the corner close to the stacked body among the bolts arranged at the corners of the opening portion of the fuel cell case. For this reason, by arranging the fastener with the high load resistance at the corner close to the stacked body (a portion on which larger axial force acts), the reaction acting on the end plate can be effectively reduced, a gap is further prevented from being formed between the end plate and the fuel cell case, and the compressive load applied to the stacked body can be further prevented from being reduced.

(3) In the fuel cell according to the above-described aspect, the plurality of types of fasteners may include a bolt with a nominal diameter of M6 and a bolt with a nominal diameter of M8, and the fastener of the type with the highest load resistance may be the bolt with a nominal diameter of M8. With this configuration, the fastening strength between the end plate and the fuel cell case can be ensured and the compressive load applied to the stacked body can be prevented from being reduced, efficiently with a small space used for arranging the fasteners. The term "a nominal diameter of M . . . " in the specification represents the outer diameter size (also referred to as shaft diameter) of a male screw complying with the "ISO (International Organization for Standardization) metric screw thread". For example, "a nominal diameter of M6" means that a male screw has an outer diameter of approximately 6 mm.

(4) In the fuel cell according to the above-described aspect, the fastener of the type with the highest load resistance may be provided in a plurality, and a straight line connecting between axial centers of the fasteners of the type with the highest load resistance arranged at two of the corners may laterally cross a stacked surface on which the unit cells are stacked. A gap is prevented from being formed between the end plats and the fuel cell case in a portion fastened with fasteners with a high load resistance. Thus, by arranging the fasteners with the high load resistance so that the straight line connecting between the axial corner of the two fasteners with the high load resistance laterally crosses the stacked surface of the unit cells, a gap is further prevented from being formed between the end plate and the fuel cell case compared with a case where the straight line connecting between the axial centers of the two fasteners with the high load resistance does not laterally cross the stacked surface of the unit cells.

(5) Another aspect of the present invention provides a fuel cell system. The fuel cell system includes the fuel cell according to the above-described aspect, an auxiliary machine that operates the fuel cell, and an auxiliary machine cover that incorporates the auxiliary machine and is fixed to the end plate. The fastener of the type with the highest load resistance is arranged within the auxiliary machine cover. With the fuel cell system according to this aspect, at least two fasteners of the type with the highest load resistance arranged so that the straight line connecting between the axial centers of the fasteners laterally crosses the stacked surface of the unit cells are arranged within the auxiliary machine cover. Thus, even when the fasteners arranged outside the auxiliary machine cover are removed by a user by mistake, the fastening state of the end plate and the fuel cell case is maintained by the fasteners of the type with the highest load resistance, and the compression state of the stacked body is less likely to be failed to be maintained.

(6) One aspect of the present invention provides a fuel cell. This fuel cell includes a stacked body formed by stacking a plurality of unit cells, an end plate arranged on at least one end of the stacked body in a stacking direction, a fuel cell case including an opening portion and incorporating the stacked body, and a plurality of types of fasteners with different load resistances that fix the end plate, closing the opening portion of the fuel cell case, to the fuel cell case. The opening portion of the fuel cell case includes at least one highly rigid portion with a rigidity higher than a rigidity of other portions of the opening portion. A fastener, of the plurality of types of fasteners, of a type with a highest load resistance is arranged at the highly rigid portion of the opening portion.

In this fuel cell, the fastener of the type with the highest load resistance is arranged at the highly rigid portion of the opening portion of the fuel cell case. Large axial force acts on the fastener arranged at the highly rigid portion of the opening portion of the fuel cell case in an axis direction of the fastener against compressive load applied to the stacked body. Since the fastener of the type with the highest load resistance is arranged at the highly rigid portion of the opening portion of the fuel cell case, the deforming (extending) of the fastener in the axis direction is prevented even when large axial force acts on the fastener, compared with a case where a fastener of a type with a low load resistance is arranged thereat. Thus, a gap is prevented from being formed between the end plate and the fuel cell case, and the compressive load applied to the stacked body can be prevented from being reduced. Fasteners of the same material provide a higher load resistance with a larger shaft diameter. For this reason, by arranging a fastener with a high load resistance at a portion where large axial force acts on the fastener, while arranging fasteners with a lower load resistance (than that of the fastener with the high load resistance) at the other portions, the fastening strength between the end plate and the fuel cell case can be ensured and the compressive load applied to the stacked body can be prevented from being reduced, efficiently with a small space used for arranging the fasteners.

(7) In the fuel cell according to the above-described aspect, when the opening portion of the fuel cell case includes a plurality of the highly rigid portions, the fastener of the type with the highest load resistance may be arranged at the highly rigid portion close to the stacked body. In the end plate disposed at one end of the stacked body, large reaction against the compressive load applied to the stacked body acts on a portion close to the stacked body. Thus, larger axial force acts on the bolt arranged at the highly rigid portion close to the stacked body among the bolts arranged at the highly rigid portion of the opening portion of the fuel cell case. For this reason, by arranging the fastener with the high load resistance at the highly rigid portion close to the stacked body (a portion on which larger axial force acts), the reaction acting on the end plate can be effectively reduced, a gap is further prevented from being formed between the end plate and the fuel cell case, and the compressive load applied to the stacked body can be further prevented from being reduced.

The present invention can be implemented in various forms, and can be implanted as a mobile object installing a fuel cell system and the like, for example.

BRIEF DESCRIPTION OF THE DRAWINGS

FIG. 3 is a plan view illustrating a schematic configuration of a fuel cell case.

FIG. 4 is a plan view illustrating a schematic configuration of a front end side end plate and an arrangement of bolts.

DESCRIPTION OF THE PREFERRED EMBODIMENTS

A. Embodiment

A1. Configuration of Fuel Cell System

Figure 1:
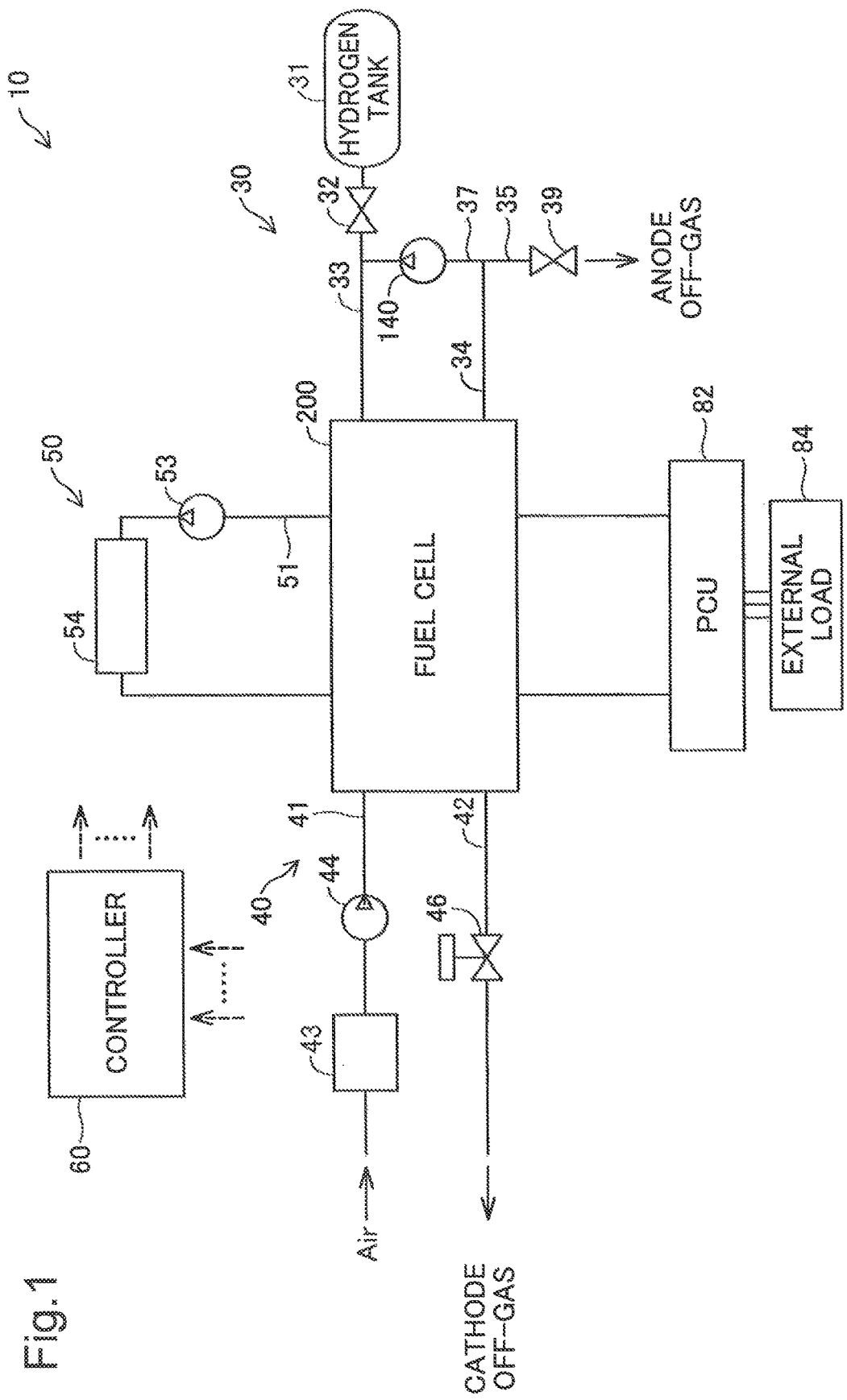
FIG. 1 is a drawing illustrating a schematic configuration of a fuel cell system as one embodiment of the present invention.

FIG. 1 is a drawing illustrating a schematic configuration of a fuel cell system as one embodiment of the present invention. A fuel cell system 10 according to the present embodiment includes a fuel cell 200, a hydrogen supply and discharge system 30 that supplies and discharges hydrogen as fuel gas, an air supply and discharge system 40 that supplies and discharges air as oxidant gas, a cooling system 50 that cools the fuel cell 200, and a controller 60 that controls the fuel cell system 10.

The fuel cell 200 is a solid polymer fuel cell that is relatively small and highly efficiently generates power. The fuel cell 200 obtains electromotive force through electrochemical reaction between pure hydrogen as the fuel gas and oxygen in the air as the oxidant, gas in each electrode. The fuel cell 200 has a stacked structure obtained by stacking a plurality of unit cells (not illustrated). The number of stacked cells can be appropriately set in accordance with an output requested to the fuel cell 200.

In the hydrogen supply and discharge system 30, hydrogen is discharged from a hydrogen tank 31 storing high-pressure hydrogen, and the hydrogen, with a flow rate controlled by an injector 32, is supplied to an anode of the fuel cell 200 through a pipe 33. Anode off-gas is introduced into a pipe 34, has water separated therefrom in a gas-liquid separator (not illustrated), and then is returned to the pipe 33 through a pipe 37. The water, separated frost the anode off-gas in the gas-liquid separator, is discharged to the atmosphere through a pipe 35. A shut-off valve 39 is provided on the pipe 35, and the water that has been in the anode off-gas is discharged when the shut-off valve 39 is opened. A hydrogen pump 140 is provided on the pipe 37, and adjusts a circulating flow rate of the hydrogen in the anode off-gas described above.

In the air supply and discharge system 40, compression air obtained by compression in an air compressor 44 is supplied to a cathode of the fuel cell 200 through a pipe 41. Cathode off-gas is discharged to the atmosphere through a pipe 42. An air flow meter 43 is provided on a portion of the pipe 41 on an upstream side of the air compressor 44, and measures an amount of outer air taken into the air compressor 44. An amount of air supplied by the air compressor 44 is controlled based on a measured value obtained by the air flow meter 43. A pressure meter (not illustrated) and a pressure regulating valve 46 are provided on the pipe 42. An opening degree of the pressure regulating valve 46 is adjusted based on a cathode off-gas pressure meter measured value obtained by the pressure meter.

The cooling system 50 mainly includes a pipe 51, a cooling water pump 53, and a radiator 54. The cooling water pump 53 causes cooling water to flow in the pipe 51 to circulate in the fuel cell 200 so that the fuel cell 200 is cooled. Then, the resultant water is cooled by the radiator 54 and is then supplied to the fuel cell 200 again.

The controller 60 is formed of a microcomputer including a central processing unit and a main storage device. The controller 60 receives a request to output power from an external load 84. The controller 60 causes the fuel cell 200 to generate power by controlling the components of the fuel cell system 10 described above and a power control unit (PCU) 82, in accordance with the request. The controller 60 may further include a pressure meter, a temperature meter, a current meter, a voltage meter, and the like, in addition to the components described above.

Figure 2:
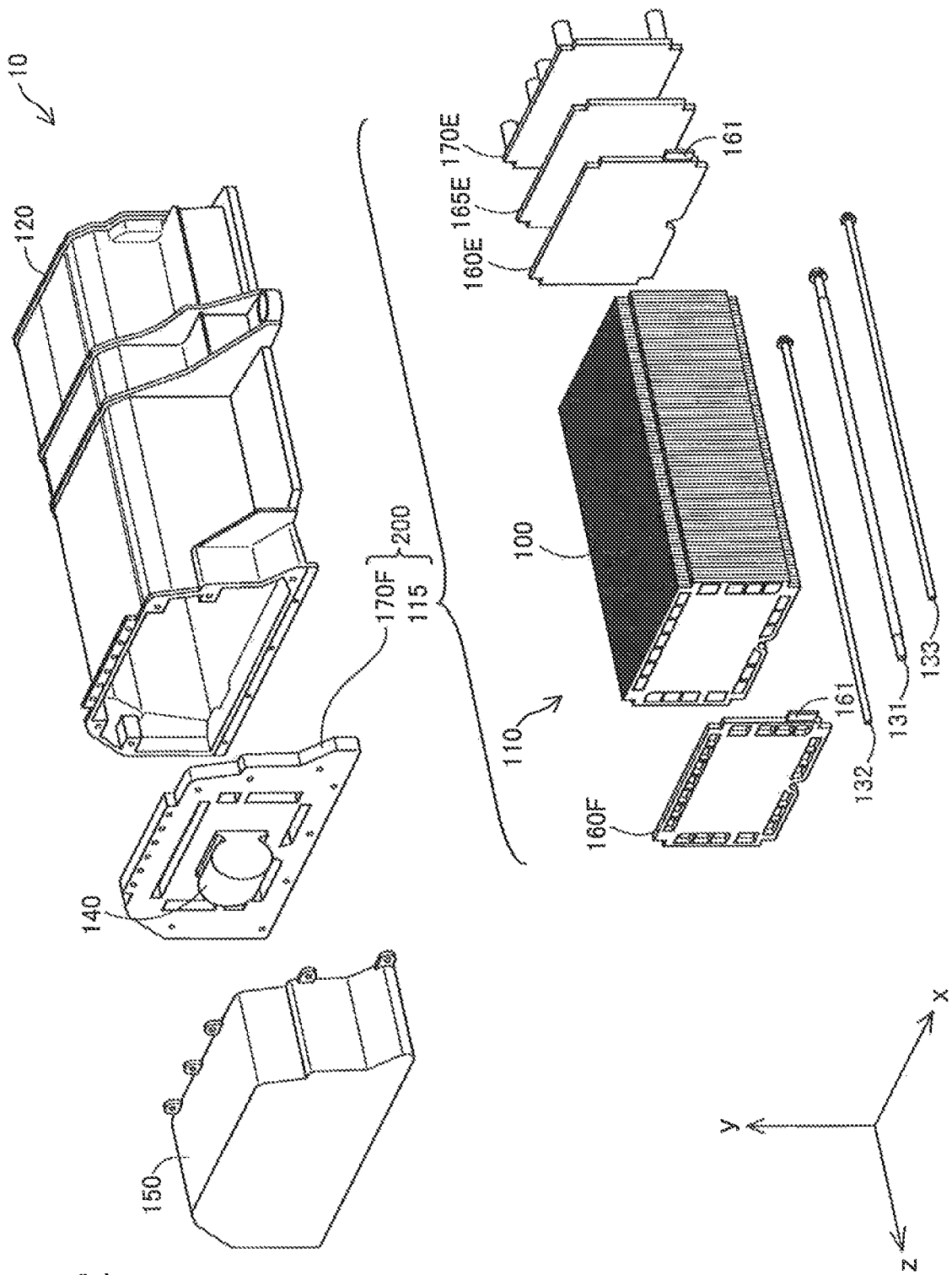
FIG. 2 is an exploded perspective view illustrating a schematic configuration of a part of the fuel cell system.

FIG. 2 is an exploded perspective view illustrating a schematic configuration of a part of the fuel cell system. As illustrated in the figure, the fuel cell system 10 according to the present embodiment includes the fuel cell 200, a hydrogen pump 140, three tension shafts 131, 132, and 133 (also collectively referred to as a tension shaft 130), a fuel cell case 120, and an auxiliary machine cover 150. In the description below, a positive Z axis direction, a negative z axis direction, a positive y axis direction, and a negative y axis direction respectively correspond to front, rear, upper, and lower directions. The hydrogen pump 140 according to the embodiment corresponds to an auxiliary machine in the claims. The fuel cell 200 and the fuel cell case 120 according to the present embodiment correspond to a fuel cell in the claims.

The fuel cell 200 has the following stacked structure. More specifically, a current, collector 160F, a front end side end plate 170F, a stacked body 110 obtained by stacking a plurality of unit cells 100 in a z axis direction (hereinafter, also referred to as "stacking direction"), a current collector 160E, an insulating plate 165E, and a rear end side end plate 170E are stacked in this order from a front side to a rear side. In the description below, a portion that does not include the front end side end plate 170F and includes the current collector 160E, the stacked body 110, the current collector 160E, the insulating plate 165E, and the rear end side end plate 170E stacked in this order is also referred to as a fuel cell body 115. The current collectors 160F and 160E are collectively referred to as a current collector 160 when they do not need to be distinguished from each other. The front end side end plate 170F in this embodiment corresponds to an end plate in the claims.

Each of the unit cells 100 includes an anode side separator, a cathode side separator, and a seal member integrated membrane electrode assembly (MEA, also referred to as a membrane electrode) all of which are not illustrated. A fuel gas supply hole, an anode off-gas discharge hole, six oxidant gas supply holes, seven cathode off-gas discharge holes, three cooling water supply holes, and three cooling water discharge holes are formed on a circumference of the unit cell 100. The supply and discharge holes are hereinafter also collectively referred to as a "supply and discharge hole". The supply and discharge holes communicate with supply and discharge holes of the current collector 160F and the front end side end plate 170F described later. When the fuel cell 200 is formed by stacking the plurality of unit cells 100, manifolds are formed by the supply and discharge holes. Through some of such manifolds, hydrogen as the fuel gas, air as the oxidant gas, and the cooling water are supplied to each of the unit cells 100. Through the others of such manifolds, the anode off-gas, the cathode off-gas, and the cooling water are discharged from each of the unit cells 100. An unillustrated seal unit is formed at a circumference of each of the supply and discharge holes. The seal unit ensures the sealing property of the manifolds between the separators and between the separator and the current collector 160, when the unit cells 100 are stacked.

The current collector 160F and the current collector 160E, respectively on the front and rear end sides, collect power generated by each or the unit cells 100, and outset the collected power to the outside through a current collecting terminal 161. The current collector 160F on the front end side includes the supply and discharge holes similar to those of the unit cells 100, on its circumference edge. The current collector 160E on the rear end side does not include the supply and discharge holes. The insulating plate 165E is an insulative resin plate and the rear end side end plate 170E is a metal plate made of aluminum. The insulating plate 165E and the rear end side end plate 170E do not have supply and discharge holes corresponding to the supply and discharge holes of each unit cell 100, as in the case of the current collector 160E. This is because the fuel cell supplies the reaction gas (hydrogen, air) and the cooling water to each of the unit cells 100 from the front end side end plate 170F on the front end side through the supplying manifolds, and discharges the off-gas and the exhaust water (cooling water) from each of the unit cells 100 from the front end side end plate 170E through the discharging manifolds. However, this should not be construed in a limiting sense. For example, the reaction gas and the cooling water may be supplied from the front end side end plate 170F, and the off-gas and the exhaust water (cooling water) may be discharged outside from the rear end side end plate 170E.

As illustrated in the figure, the fuel cell case 120 has a front side opened, and a rear side closed, by a case end surface (not illustrated). The fuel cell body 115 is accommodated in the fuel cell case 120, and the front end side end plate 170F, closing the opening on the front side of the fuel cell case 120, is fixed by a bolt. In this state, the front end side end plate 170F, the current collector 160F, the stacked body 110, the current collector 160E, the insulating plate 165E, and the rear end side end plate 170E are stacked in this order to form the fuel cell 200.

The tension shaft 130 is disposed on a lower side of the fuel cell body 115 (on a side of the negative y axis direction in FIG. 2), and receives a load of the fuel cell body 115. The tension shaft 130 has a front side connected to the front end side end plate 170F and a rear side connected to the case end surface. The fuel cell case 120 has a lower side opened, and is closed by a case cap (not illustrated) in a state where the fuel cell body 115 is incorporated.

A through hole for pressing (not illustrated) is formed on the case end surface on the rear side of the fuel cell case 120. In a state where the fuel cell body 115 is incorporated in the fuel cell case 120 and the front end side end plate 170F is fastened to fine fuel cell case 120, from the outside of the fuel cell case 120 through the through hole for pressing, pressing force, in the stacking direction of the fuel cell 200, is applied to the rear end side end plate 170E by a pressing shaft (not illustrated), and the rear end side end plate 170E is fixed while being pressed with a load adjusting screw (not illustrated). Thus, the pressing force (compressive load) in the stacking direction is applied to the stacked body 110. The compressive load applied to the stacked body 110 is maintained by a bolt (described later) fastening the front end side end plate 170F to the fuel cell case 120. Thus, the stacked state of the components of the fuel cell 200 is maintained, and a favorable contact state among the components is maintained.

As described above, the hydrogen pump 140 adjusts the circulating flow rate of hydrogen in the anode off-gas discharged from the fuel cell 200, and supplies the resultant hydrogen to the fuel cell 200. The hydrogen pump 140 is fixed to the front end side end plate 170F as illustrated in the figure.

The auxiliary machine cover 150 has an opening on the rear side, and is fixed to the front end side end plate 170F to have an opening on the rear side closed by the front end side end plate 170F in a state of incorporating the hydrogen pump 140. The auxiliary machine cover 150, incorporating the hydrogen pump 140 in the present embodiment, may further incorporate other auxiliary machines such as the air compressor 44 and the cooling water pump 53. The hydrogen pump 140, fixed to the front end side end plate 170F in the present embodiment, may be fixed to the auxiliary machine cover 150.

A2. Configuration of Fuel Cell Case

FIG. 3 is a plan view illustrating a schematic configuration of the fuel cell case. FIG. 3 illustrates an opening portion 121 of the fuel cell case 120. As illustrated in the figure, the opening portion 121 of the fuel cell case 120 has a substantially octagonal outer circumference shape with corners 122, 123, 124, 125, 126, 127, 128, and 129. The corners 122 to 129 of the opening portion 121 are each a round (chamfered) corner. The outer shape is referred to as the "substantially" octagonal shape due to the chamfered corners. As illustrated in FIG. 2, the shape of the opening portion 121 of the fuel cell case 120 is substantially the same as the cross-sectional shape at a portion close to the opening portion 121 of the fuel cell case 120. A threaded hole 138, to which a bolt having a nominal diameter of M6 is screwed, is formed at each of the corners 122, 126, and 128 of the opening portion 121 of the fuel cell case 120. A threaded hole 139, to which a bolt having a nominal diameter of M8 is screwed, is formed at each of the corners 124 and 129. Six threaded holes 138 (to which bolts having a nominal diameter of M6 are screwed) are formed in a top side (side parallel with the x axis) of the opening portion 121 of the fuel cell case 120. Four threaded holes 138 (to which bolts having a nominal diameter of M6 are screwed) are formed in a bottom side (side parallel with the x axis) of the opening portion 121.

The fuel cell case 120 according to the present embodiment is made of polypropylene (PP). As illustrated in FIG. 2, the fuel cell case 120 has an xy cross section of a substantially polygonal shape with a plurality of corners as in the case of the opening portion 121. The shape features rigidity at the corners higher than the other portions (surface). Similarly, in the opening portion 121 of the fuel cell case 120, the rigidity is higher at the corners 122 to 129 than the other portions (sides excluding the corners). The material of the fuel cell case 120 is not limited to PP, and may be other types of resin such as polyethylene (PE) or polystyrene (PS).

A3. Configuration of Front End Side End Plate and How Bolts are Arranged

FIG. 4 is a plan view illustrating a schematic configuration of the front end side end plate and how the bolts are arranged according to one embodiment of the present invention. FIG. 4 illustrates a surface on which the hydrogen pump 140 is fixed (hereinafter, also referred to as a pump surface). As described above, the front end side end plate 170F is disposed on the front end side of the stacked body 110 with the current collector 160F disposed in between. FIG. 4 illustrates the positional relationship between the front end side end plate 170F and the stacked body 110, with a one dot chained line representing an arranged frame W as a position where the stacked body 110 is arranged. As described above, the tension shafts 131, 132, and 133 are connected to the front end side end plate 170F. In FIG. 4, dashed lines represent portions where the tension shafts 131, 132, and 133 are arranged.

The front end side end plate 170F has an outer circumference shape that is substantially the same as that of the opening on the front side of the fuel cell case 120 (FIG. 2). As illustrated in FIG. 4, the front end side end plate 170F has a fuel gas supply hole 172IN, an anode off-gas discharge hole 172OT, an oxidant gas supply hole 174IN, a cathode off-gas discharge hole 174OT, a cooling water supply hole 176IN, and a cooling water discharge hole 176OT formed at portions within the arranged frame W close to the circumference edge. When the front end side end plate 170F is stacked on the front end side of the stacked body 110 with the current collector 160F disposed in between, the supply and discharge holes communicate with the respective manifolds formed in the stacked body 110.

The front end side end plate 170F has threaded holes (not illustrated), to which bolts 178 with a nominal diameter of M6 are screwed, at positions corresponding to the threaded holes 138 of the fuel cell case 120, as well as threaded holes (not illustrated), to which bolts 179 with a nominal diameter of M8 are screwed, at positions corresponding to the threaded holes 139. FIG. 4 illustrates a state where the bolts 178, with a nominal diameter of M6, as well as the bolts 179, with a nominal diameter of M8 are screwed to the respective threaded holes formed in the front end side end plate 170F. In FIG. 4, the corners 122 to 129 of the opening portion 121 of the fuel cell case 120, in a state where the front end side end plate 170F is fixed to the fuel cell case 120, are illustrated in parentheses.

The bolts 178 and 179 are each a flanged hexagonal bolt made of carbon steel. As described above, the nominal diameter of a shaft portion of each bolt 178 is M6, and the nominal diameter of a shaft portion of each bolt 179 is M8.

Thus, the bolt 179, having a larger shaft diameter than the bolt 178, has a higher load resistance than the bolt 178.

The front end side end plate 170F is disposed to close the opening portion 121 of the fuel cell case 120. The plurality of bolts 178 and 179 are screwed to the plurality of respective threaded holes 138 and 139 formed on the front end side end plate 170F and on the fuel cell case 120. Thus, the front end side end plate 170F is fastened to and thus is fixed to the fuel cell case 120 with the plurality of bolts 178 and 179.

In the present embodiment, the bolts 178 and 179 disposed at the corners 122, 124, and 129 (in parentheses in FIG. 4) of the opening portion 121 of the fuel cell case 120 are close to the stacked body 110. The axial force acting on the bolts disposed on the opening portion 121 of the fuel cell case 120 is produced by reaction acting on the front end side end plate 170F against the compressive load applied to the stacked body 110. Thus, larger axial force is applied to the bolts disposed close to the stacked body 110 than the bolts disposed away from the stacked body 110. Furthermore, higher axial force is applied to the bolts disposed at a higher rigidity portion of the opening portion 121 of the fuel cell case 120, where the threaded holes in which female screws are formed, are arranged than that applied to the bolts disposed at a lower rigidity portion. As described above, the opening portion 121 of the fuel cell case 120 has higher rigidity at the corners. Thus, of all the bolts 178 and 179 arranged on the opening portion 121 of the fuel cell case 120, those arranged close to the corners of the opening portion 121 and close to the stacked body 110 receive axial force larger than that applied to the other bolts.

In this specification, a portion where a ratio of a distance to the outer circumference surface of the stacked body 110 to a shorter side length H (see FIG. 4) of the stacked surface (surface on which the unit cells 100 are stacked) of the stacked body 110 is 20% or less is referred to as a portion close to the stacked body 110. As illustrated in FIG. 4, distances from the axial centers of the bolts 178 and 179 arranged at the respective corners 122, 124, 126, 128, and 129 of the opening portion 121 of the fuel cell case 120 to the side surface of the stacked body 110 are respectively defined as L1, L2, L3, L4, and L5. The ratio of each of the distances L1, L2, and L5 to the shorter side length H of the stacked surface (xy plane) of the stacked body 110 is not higher than 20%, whereas the ratio of each of the distances L3 and L4 to the shorter side length H is higher than 20%. In the present embodiment, the bolts 176 and 179 arranged at the corners 122, 124, and 129 of the opening portion 121 of the fuel cell case 12 close to the stacked body 110 receive larger axial force than that applied to the other bolts 178. In the present environment, each of the unit cells 100 has a substantially rectangular shape obtained by cutting away the four corners of a rectangle. Here, the distance between each bolt and the stacked body 110 is measured with the shape of the unit cell 100 regarded as a rectangular shape with no cutaway portion. The area of the cutaway portion is smaller than the area of the stacked surface (xy plane) of the unit cell 100. Furthermore, the front end side end plate 170F has high rigidity to receive the compressive load applied to the stacked body 110. All things considered, the cutaway portions have a limited effect on the axial force acting on the bolts in accordance with the compressive load applied to the stacked body 110.

In the present embodiment, the bolts 179 with a high load resistance are arranged at the corners 124 and 129 of the opening portion 121 of the fuel cell case 120. As described above, the bolts 179 arranged at the corners 124 and 129 of the opening portion 121 of the fuel cell case 120 receive large axial force, but with the high load resistance, the shaft portions of the bolts 179 can be prevented from deforming (extending). In the present invention, the tension shaft 130 is disposed close to a bottom side of the stacked body 110, and has one end connected to she fuel cell case 120 and the other end connected to the front end side end plate 170F. Thus, the compressive load applied to the stacked body 110 at the portion close so the stacked side of the stacked body 110 is received by the tension shaft 130, so that large axial force is nor applied to the bolt 178 arranged at the corner 126.

In the present embodiment, the portions (corners) where the bolts 179 with a high load resistance are arranged are determined based on a result of simulating the load (axial force) applied to each bolt with a computer aided engineering (CAE) system. The corner 122 of the opening portion 121 of the fuel cell case 120 is close to the stacked body 110. Still, the bolt 178 is arranged thereat for the sake of space saving, because the result of the simulation indicates that the bolt 178 with a nominal diameter of M6 can withstand the load acting on the bolt arranged at the corner 122. A smaller number of bolts 179 can reduce the space where the bolts are arranged.

The auxiliary machine cover 150 is fixed to the pump surface 17 of the front end side end plate 170F. FIG. 4 illustrates a positional relationship between the front end side end plate 170F and the auxiliary machine cover 150 with a two dot chained line representing a portion where the auxiliary machine cover 150 is arranged. In the present embodiment, the bolts 178 and 179 arranged at the corners 122, 124, 126, 128, and 129 of the opening portion 121 of the fuel cell case 120 are incorporated in the auxiliary machine cover 150.

The front end side end plate 170F is an aluminum die-cast piece, manufactured by high pressure casting using aluminum, and has a surface to be in contact with the current collector 160F coated with insulative resin. Thus, when the front end side end plate 170F is arranged while being in contact with the current collector 160F, the front end side end plate 170F and the fuel cell body 115 are electrically insulated from each other. Titanium, stainless steel, an alloy of these, an alloy of aluminum and these, or the like may be used instead of aluminum. Furthermore, instead of performing coating with the insulative resin, an insulating plate equivalent to the insulating plate 165E may be provided between the front end side end plate 170F and the current collector 160F.

A4. Effects of Embodiment

In the fuel cell 200 according to the embodiment, the front end side end plate 170F is fixed to the fuel cell case 120 with the bolts 178 having a nominal diameter of M6 and the bolts 179 having a nominal diameter of M8. As described above, the compressive load in the stacking direction is applied to the stacked body 110, and reaction against the compressive load acts in the stacking direction on the front end side end plate 170F. Thus, the force in the axis direction acts on the bolts 178 and 179 fastening the front end side end plate 170F to the fuel cell case 120. Large reaction against the compressive load acts on a portion close to the edge (arranged frame W in FIG. 4) of the stacked body 110 in the xy plane of the front end side end plate 170F. The opening portion 121 of the fuel cell case 120 has high rigidity at the corners, and thus large axial force acts on the bolts 178 and 179. Thus, the axial force acting on the bolts 178 and 179 is larger at a portion of the corners (high rigidity portion) of the opening portion 121 of the fuel cell case 120 close to the stacked body 110. In the fuel cell 200 according to the embodiment, the boles 179, with a higher load resistance than the bolts 178, are arranged at the corner 124 and the corner 129 as two of the corners of the fuel cell case 120 close to the edge of the stacked body 110. Thus, compared with a case where the bolts 176 are arranged thereat, the extending (deforming) of rue bolts 179 in the stacking direction is prevented, whereby a gap is prevented from being formed between the front end side end plate 170F and the fuel cell case 120. As a result, the compressive load applied to the stacked body 110 can be prevented from being reduced.

In the fuel cell 200, as described above, the bolts 179 with a high load resistance are used at portions where the bolts receive large axial force, and the bolts 178 with a lower load resistance than that of the bolts 179 and a small shaft diameter are used at the other portions. Thus, the fastening strength between the end plate and the fuel cell case can be ensured, the favorable compression state of the stacked body 110 can be maintained, and the compressive load applied to the stacked body 110 can be prevented from being reduced with the compression state of the stacked body 110 favorably maintained, efficiently with a small space used for arranging fasteners.

In the fuel cell 200, a straight line connecting between the two bolts 179 laterally crosses the stacked surface of the stacked body 110. Thus, the reaction acting on the front end aide end plate 170F against the compressive load applied to the stacked body 110 can be well received by the two bolts 179 with a high load resistance. Furthermore, the gap can be more effectively prevented from being formed between the front end side end plate 170F and the fuel cell case 120, even when the bolts 178 with a low load resistance are used for the other portions.

In the fuel cell system 10 according to the embodiment, the bolts 178 and 179, arranged at the corners 122, 124, 126, 120, and 129 of the opening portion 121 of the fuel cell case 120, are arranged within the auxiliary machine cover 150 incorporating the hydrogen pump 140. For example, a user sometimes removes the auxiliary machine cover 150 for maintaining the auxiliary machines such as the hydrogen pump 140 or the other like purposes. Here, the bolts 178 and 179, arranged at the earners 122, 124, 126, 128, and 129 of the opening portion 121, are arranged within the auxiliary machine cover 150 and thus can be prevented from being removed by the user by mistake. In the fuel cell system 10 according to the embodiment, the two bolts 179 with a high load resistance are arranged within the auxiliary machine cover 150. Thus, even when the bolts 178, arranged outside the auxiliary machine cover 150, are removed by the user by mistake, the fuel cell body 115 is less likely to jump out of the fuel cell case 120 with the front end side end plate 170F detached from the fuel cell case 120.

B. Modifications

The present invention is not limited to the embodiment or aspects described above, and can be embodied in various aspects without departing from the spirit of the invention. For example, the technical features of the embodiment corresponding to the technical features of each aspect described in the summary can be replaced or combined as appropriate so as to solve a part or she whole of the problem described above or achieve a part or the whole of the effects described above. Furthermore, technical features that are not described as being essential in the specification can be deleted as appropriate. Modifications below are applicable, for example.

(1) The bolts for fixing the front end side end plate 170F to the fuel cell case 120 are not limited to the flanged hexagonal bolts as exemplified in the embodiment. For example, other bolts such as a hexagonal bolt without a flange, a bolt with a hexagonal hole, screws such as machine screws, or an unthreaded fastener such as a rivet may be used.

(2) The present invention is not limited to the example where the bolts 178 with a nominal diameter of M6 and the bolts 179 with a nominal diameter of M8 are used, and any fasteners of two types or more with different load resistances may be used. For example, bolts with a nominal diameter of M5 and bolts with a nominal diameter of M6 may be used, or bolts with a nominal diameter of M8 and bolts with a nominal diameter of M10 may be used. The combination of bolts may be appropriately set based on the axial force acting on the bolts, the space where the bolts are arranged, and the like. With bolts with a relatively high load resistance arranged at corners (highly rigid portions) of the opening portion and bolts with a low load resistance (with a small shaft diameter) arranged at the other portions, the compressive load applied to the stacked body 110 can be prevented from being reduced, with a small space used for arranging the bolts.

(3) In the embodiment, a case is exemplified where the two types of bolts with different shaft diameters are used. Alternatively, two types of bolts made of different materials may be used to provide two types of bolts with different load resistances. For example, bolts with a nominal diameter of M6 made of stainless steel (with a higher load resistance than the bolts 178) may be used instead of the bolts 179. Bolts with a nominal diameter of M6 made of carbon steel with a larger content of carbon than in the carbon steel forming the bolts 178 may be used instead of the bolts 179. Bolts obtained by thermally processing the shaft of the bolts 178 to achieve n higher load resistance may be used instead of the bolts 179. Thus, compressive load applied to the stacked body 110 can be prevented from being reduced, with a small space used for arranging the bolts.

(4) In the embodiment, an example is described where the two bolts 179 are arranged at the corners 124 and 129 of the opening portion 121 of the fuel cell case 120 that are close to the stacked body 110. However, this should not be construed in a limiting sense. The two bolts 179 may be arranged at corners of the opening portion 121 of the fuel cell case 120 not close to the stacked body 110. The corners of the opening portion 121 of the fuel cell case 120 are more rigid than the other portions (sides), and thus the bolts thereat are likely to receive large axial force. Thus, by arranging the bolts 179 with a high load resistance at the corners of the opening portion 121 of the fuel cell case 120, the shafts of the bolts can be more effectively prevented from deforming (extending) and the compressive load applied to the stacked body 110 can be more effectively prevented from being reduced, than in a case where the front end side end plate 170F is fixed to the fuel cell case 120 by using only the bolts 178. Still, bolts with a high load resistance are preferably disposed at the corners of the opening portion 121 of the fuel cell case 120 close to the stacked body 110, where the bolts thereat receive larger axial force.

(5) The number of bolts 179 with a high load resistance, which is two in the embodiment, may be at least one. Even when a single bolt with a high load resistance is arranged at a corner of the opening portion 121 of the fuel cell case 120, the shaft of the bolt can be more effectively prevented from deforming (extending) and the compressive load applied to the stacked body 110 can be more effectively prevented from being reduced, than in a case where the front end side end plate 170F is fixed to the fuel cell case 120 by using only the bolts 178. Still, two or more bolts with a high load resistance are preferably arranged in such a manner that the straight line, connecting between the axial centers of the bolts, laterally crosses the stacked surface of the unit cells 100 as in the embodiment, so that the reaction acting on the front end side end plate 170F can be more effectively regulated. The number of bolts 179 with a high load resistance may be equal to or larger than three and smaller than the number of corners of the opening portion 121 ("eight" in the embodiment) of the fuel cell case 120. By arranging all the bolts 179 at the respective corners, the gap can be prevented from being formed between the front end side end plate 170F and the fuel cell case 120 and the compressive load applied to the stacked body 110 can be prevented from being reduced, while ensuring space efficiency.

(6) In the embodiment, the example is described where the bolts 178 and 179, arranged at the corners 122, 124, 126, 128, and 129 of the opening portion 121 of the fuel cell case 120, are arranged within the auxiliary machine cover 150 incorporating the hydrogen pump 140. Only at least the two bolts 179 with a high load resistance need be arranged within the auxiliary machine cover 150. The fixed state of the front end side end plate 170F is likely to be maintained even when the other bolts 178 are removed, as long as the front end side end plate 170F is fixed to the fuel cell case 120 with the two bolts 179 with a high load resistance. Thus, the fuel cell body 115 is less likely to jump out of the fuel cell case 120 due to the failure to maintain the fixed state between the front end side end plate 170F and the fuel cell case 120.

(7) The portion where the bolts 179 with a high load resistance are arranged is not limited to corners of the opening portion 121 of the fuel cell case 120 as in the embodiment. For example, the bolts 179 may be arranged at thick and thus rigid portions of the opening portion 121 of the fuel cell case 120. The bolts arranged at rigid portions of the opening portion 121 of the fuel cell case 120 receive large axial force. Thus, by arranging the bolts with a high load resistance at rigid portions of the opening portion 121 of the fuel cell case 120, the bolts are prevented from extending (deforming) in the stacking direction, whereby the gap can be prevented from being formed between the front end side end plate 170F and the fuel cell case 120. As a result, the compressive load applied to the stacked body 110 can be prevented from being reduced. The bolts 179 with a high load resistance are more preferably arranged at portions of the opening portion 121 of the fuel cell case 120 that are rigid and close to the stacked body 110. The rigid portions in this modification correspond to a highly rigid portion in the claims.

(8) In the embodiment, the example is described where the front end side end plate 170F is fixed to the fuel cell case 120 with the two different types of bolts 178 and 179 with different load resistances. Alternatively, three or more types of bolts with different load resistances may be used. In such a case, the bolts with the highest load resistance may be arranged at the corners or rigid portions of the opening portion 121 of the fuel cell case 120.

(9) In the embodiment, the example is described where the front end side end plate 170F is fixed to the fuel cell case 120 with the bolts. However, this should not be construed in a limiting sense. The fuel cell case may also include an opening portion on the rear end side and the rear end side end plate 170E may be fixed to the opening portion on the rear end side with a bolt. In such a case, the rear end side end plate 170E may have the same configuration as the front end side end plate 170F. Thus, the shaft of the bolt can be prevented from deforming (extending) to prevent the gap from being formed between the rear end side end plate and the fuel cell case while ensuring the space efficiency, also on the rear end side end plate.

(10) The shape of the opening portion 121 of the fuel cell case 120 is not limited to that in the embodiment, and may be a substantially triangular, rectangular, pentagonal, or hexagonal shape (including shapes with chamfered corners). Also in this case, the shaft of the bolts can be prevented from deforming (extending) and the gap can be prevented from being formed between the end plate and the fuel cell case while ensuring space efficiency, by arranging bolts of a type with a high load resistance at the corners.

(11) The outer circumference shape of the front end side end plate 170F is not limited to a shape that is substantially the same as that of the opening portion 121 of the fuel cell case 120 as in the embodiment, and may be of any of various shapes that can close the opening portion 121 of the fuel cell case 120. Even when the outer circumference shape of the end plate is different from that of the opening portion 121 of the fuel cell case 120, the end plate can be arranged to close the opening portion 121 of the fuel cell case 120, and the bolts 179 with a high load resistance can be arranged at the corners of the opening portion 121.

What is claimed is:

1. A fuel cell comprising:
    a stacked body formed by stacking a plurality of unit cells;
    an end plate arranged on at least one end of the stacked body in a stacking direction;
    a fuel cell case including an opening portion having an opening formed therein to receive the stacked body, wherein the opening portion has a substantially polygonal outer circumference shape with a plurality of corners, and holes are formed in the opening portion of the fuel cell case; and
    a plurality of types of fasteners with different load resistances that fix the end plate to the opening portion of the fuel cell case to close the opening of the fuel cell case, wherein
    a fastener, of the plurality of types of fasteners, of a type with a highest load resistance is arranged at at least one of the plurality of corners of the opening portion,
    each of the plurality of types of fasteners is configured to extend within a respective one of the holes formed in the opening portion of the fuel cell case and to exert a force on the end plate in a direction towards the stacked body when each of the plurality of types of fasteners fixes the end plate to the opening portion of the fuel cell case, and
    the holes formed in the opening portion of the fuel cell case are arranged on the same side of the end plate as the stacked body.

2. The fuel cell in accordance with claim 1, wherein a ratio of a distance between (a) the corner where the fastener of the type with the highest load resistance is arranged and (b) an outer circumference surface of the stacked body to shorter side length of a stacked surface of the stacked body is 20% or less.

3. The fuel cell in accordance with claim 1, wherein
    the plurality of types of fasteners include a bolt with a nominal diameter of M6 and a bolt with a nominal diameter of M8, and the fastener of the type with the highest load resistance is the bolt with a nominal diameter of M8.

4. The fuel cell in accordance with claim 1, wherein
the fastener of the type with the highest load resistance is provided in a plurality, and
a straight line connecting between axial centers of the fasteners of the type with the highest load resistance arranged at two of the corners laterally crosses a stacked surface on which the unit cells are stacked.

5. A fuel cell system comprising:
the fuel cell in accordance with claim 4;
an auxiliary machine that operates the fuel cell; and
an auxiliary machine cover that incorporates the auxiliary machine and is fixed to the end plate,
wherein the fastener of the type with the highest load resistance is arranged within the auxiliary machine cover.

6. The fuel cell in accordance with claim 1, wherein the plurality of types of fasteners are bolts that are formed of a same material and are different from each other in an outer dimension of a male screw.

7. A fuel cell comprising
a stacked body formed by stacking a plurality of unit cells;
an end plate arranged on at least one end of the stacked body in a stacking direction;
a fuel cell case including an opening portion having an opening formed therein to receive the stacked body, wherein holes are formed in the opening portion of the fuel cell case; and
a plurality of types of fasteners with different load resistances that fix the end plate to the opening portion of the fuel cell case to close the opening of the fuel cell case, wherein
the opening portion of the fuel cell case includes at least one highly rigid portion with a rigidity higher than a rigidity of other portions of the opening portion,
a fastener, of the plurality of types of fasteners, of a type with a highest load resistance is arranged at the highly rigid portion of the opening portion,
each of the plurality of types of fasteners is configured to extend within a respective one of the holes formed in the opening portion of the fuel cell case and to exert a force on the end plate in a direction towards the stacked body when each of the plurality of types of fasteners fixes the end plate to the opening portion of the fuel cell case, and
the holes formed in the opening portion of the fuel cell case are arranged on the same side of the end plate as the stacked body.

8. The fuel cell in accordance with claim 7, wherein
the opening portion of the fuel cell case includes a plurality of the highly rigid portions, and
a ratio of a distance between (a) the fastener of the type with the highest load resistance and (b) an outer circumference surface of the stacked body to a shorter side length of a stacked surface of the stacked body is 20% or less.

* * * * *